(12) United States Patent
Chi et al.

(10) Patent No.: US 7,142,124 B2
(45) Date of Patent: Nov. 28, 2006

(54) PACKAGING INCORPORATING VOLUME-MEASUREMENT CAPABILITY USING RFID TAGS

(75) Inventors: Hye S. Chi, Raleigh, NC (US); Timothy W. Crockett, Raleigh, NC (US); Jeff D. Thomas, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 196 days.

(21) Appl. No.: 11/024,915

(22) Filed: Dec. 28, 2004

(65) Prior Publication Data

US 2006/0145880 A1    Jul. 6, 2006

(51) Int. Cl.
*G08B 21/00* (2006.01)
*G08B 13/14* (2006.01)

(52) U.S. Cl. ............... 340/612; 340/572.1; 342/124

(58) Field of Classification Search .......... 340/612, 340/572.1, 572.7, 572.8, 615, 617, 618
See application file for complete search history.

(56) References Cited

U.S. PATENT DOCUMENTS

| 6,547,040 | B1 | 4/2003 | Goodwin, III | 186/61 |
| 6,614,351 | B1 | 9/2003 | Mann et al. | 340/572.1 |
| 6,724,308 | B1 | 4/2004 | Nicholson | 340/572.1 |
| 7,040,139 | B1* | 5/2006 | Sunshine | 73/23.2 |
| 2001/0054755 | A1 | 12/2001 | Kirkham | 257/678 |
| 2002/0067267 | A1 | 6/2002 | Kirkham | 340/572.7 |
| 2003/0067381 | A1 | 4/2003 | Mitchell et al. | 340/5.92 |
| 2004/0051368 | A1 | 3/2004 | Caputo et al. | 299/1.9 |
| 2006/0132351 | A1* | 6/2006 | Le Sesne | 342/124 |

\* cited by examiner

*Primary Examiner*—Toan N. Pham
(74) *Attorney, Agent, or Firm*—Synnestvedt & Lechner LLP; Mark E. McBurney (57) ABSTRACT

A method and system is disclosed for enabling quantities of bulk-type products to be determined using RFID tags that can also be used to determine the existence of product or packaging containing RFID tags. Packaging and/or containers for the bulk products are configured so that the RFID tags contained thereon provide an indication of an approximate relative quantity of the bulk material. More specifically, the position and/or shielded or unshielded state of RFID tags are utilized to identify a quantity of the bulk-type material.

10 Claims, 7 Drawing Sheets

PACKAGING INCORPORATING VOLUME-MEASUREMENT CAPABILITY USING RFID TAGS

BACKGROUND OF THE INVENTION

1. Field of the Invention

The present invention relates in general to radio frequency identification tags, and more particularly, to the use of RFID tags to track quantities of loose materials or items.

2. Description of the Related Art

Radio frequency identification (RFID) technology tags are devices that are affixed to various articles so that these articles may be easily tracked during movement from one point to another, or identified through a sales transaction. Any type of object, including assets, animals, and people can be tagged so that they may be identified or tracked automatically via a reader, which is typically connected to a host computer that may contain additional data related to an object's identification number associated with the RFID tag. In addition, RFID tags generally contain program information about an object to which it is attached. Through the use of such information, RFID technology may be used to identify objects automatically and without manual handling operations as is required in most bar code systems.

The operation of typical RFID tagging systems is well known and is not described in detail herein. Many examples describing the operation of such systems can be found, for example, U.S. Pat. No. 5,822,714 assigned to International Business Machines Corporation, the contents of which are incorporated by reference herein.

With the proliferation of RFID tags on products, it is not surprising that their existence on products was leveraged for use outside of the retail establishment from which they were sold. RFID tags were originally designed to assist merchants in tracking inventory within the store and in processing the sale of the merchandise at the check out counter. However, savvy consumers quickly realized that they could also use the existence of the RFID tags in products that they purchased to, for example, keep an electronic inventory of food products, staples, etc. within the kitchen or elsewhere in the home. For example, the same technology used to monitor the existence of products in the store can now be used to monitor the existence of products in the home.

However, a problem exists when an item is of a type that is not consumed all at once and that contains bulk or loose quantities of the product. For example, items such as cereal, flour, sugar and the like will typically be used over a period of days or weeks, and existing RFID tag systems will merely provide the consumer with information regarding the existence or non-existence of the packaging containing the bulk item. Thus, for example, to a consumer, a full, unopened box of cereal will look identical to an almost completely empty box of cereal, i.e., in both cases, the consumer will only know that there is a box of the cereal in the pantry but will not be aware of the quantity of cereal within the box. Accordingly, it would be desirable to have a method and system for monitoring quantities of bulk-type items using RFID tags.

SUMMARY OF THE INVENTION

The present invention is a method and system for enabling quantities of bulk-type products to be determined using RFID tags that can also be used to determine the existence of product or packaging containing RFID tags. Packaging and/or containers for the bulk products are configured so that the RFID tags contained thereon provide an indication of an approximate relative quantity of the bulk material. More specifically, the position of RFID tags are utilized to identify a quantity of the bulk-type material. This can be performed by numerous methods described and claimed herein.

BRIEF DESCRIPTION OF THE DRAWINGS

FIGS. 3A–3F illustrate an alternative embodiment of the present invention.

DETAILED DESCRIPTION OF THE PREFERRED EMBODIMENTS

Figure 1:
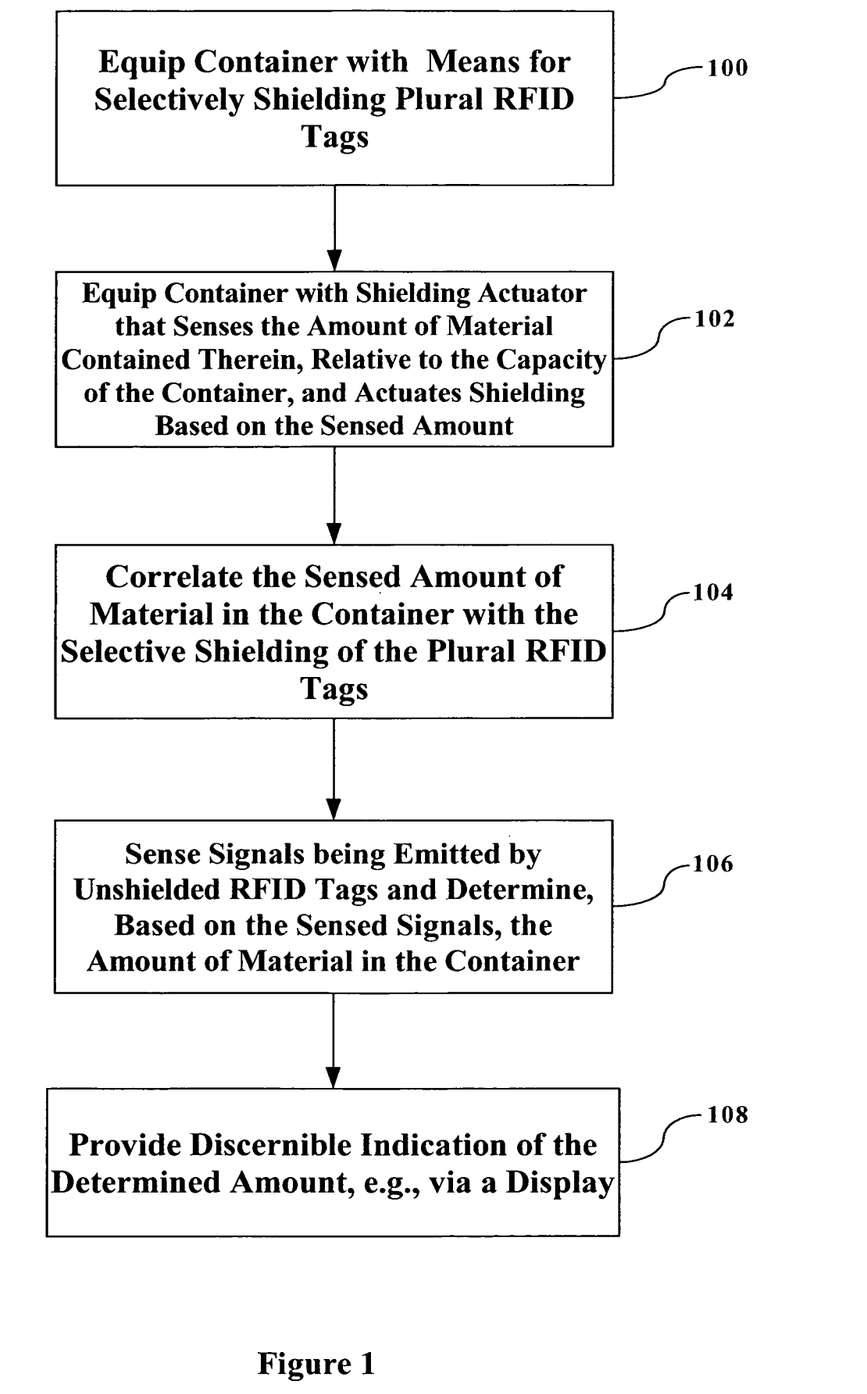
FIG. 1 is a flowchart illustrating the basic steps of the present invention.
Figure 2A:
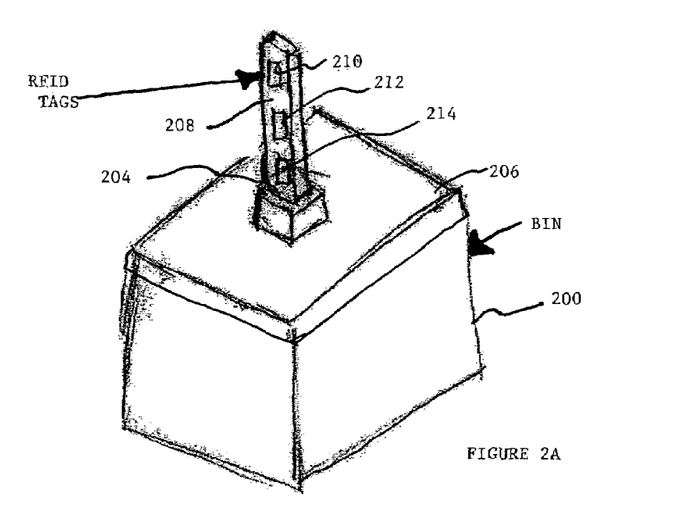
FIGS. 2A–2D are a perspective view, a side cutaway side view of a full bin, and a side cutaway view of a half-full bin, all in accordance with one embodiment of the present invention.
Figure 2B:
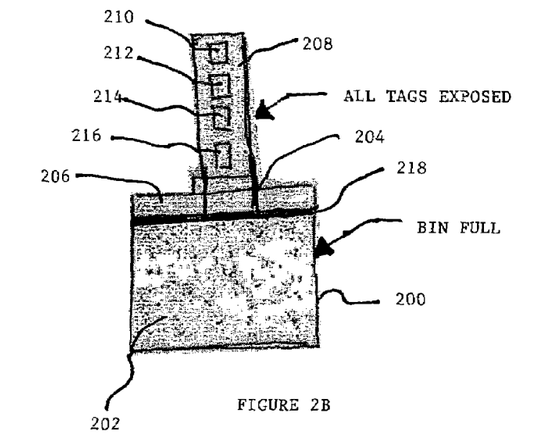
Figure 2C:
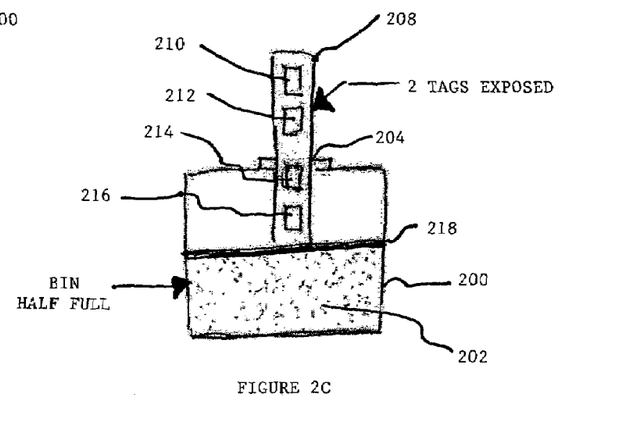
Figure 2D:
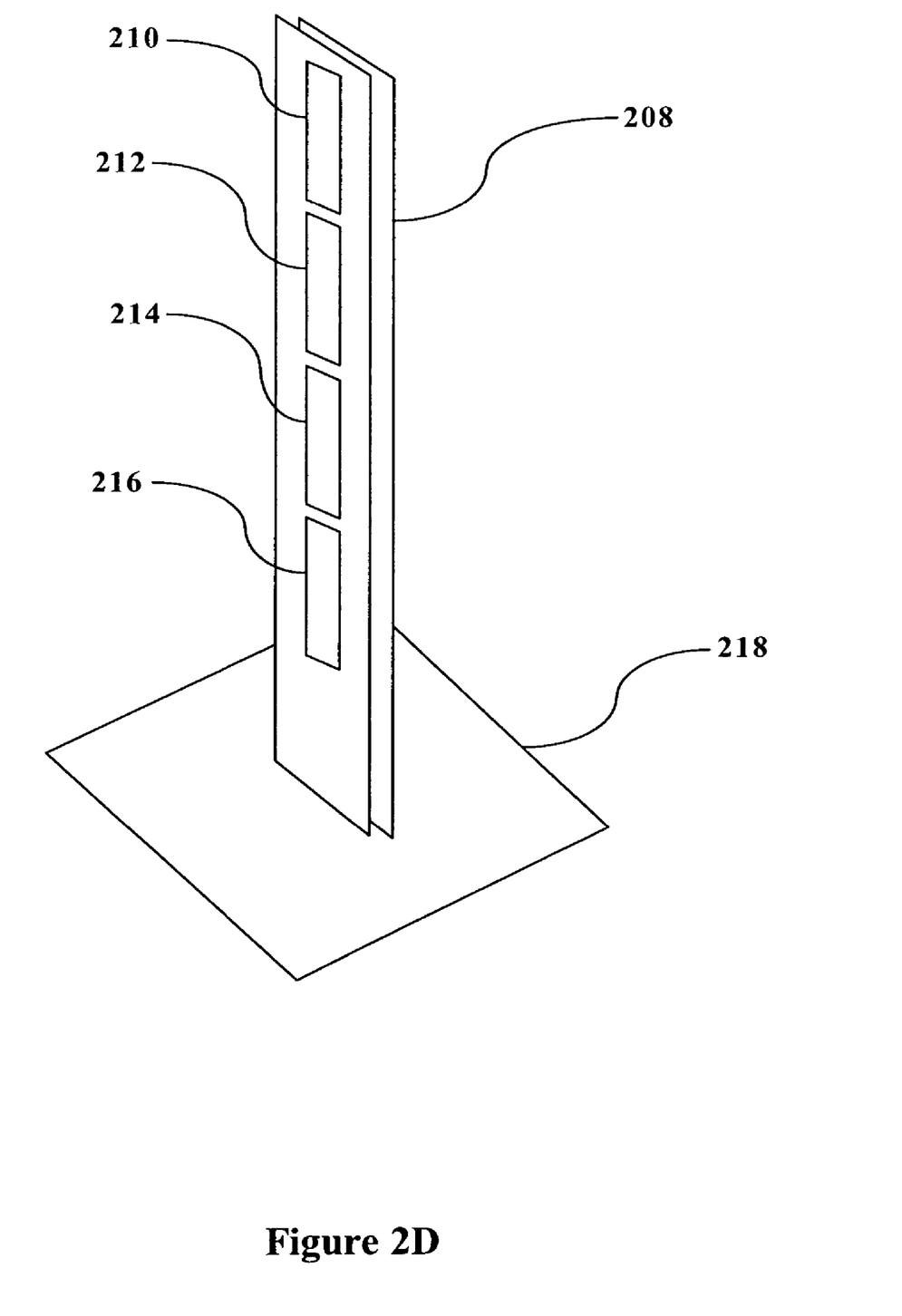

FIG. 1 is a flowchart illustrating the basic steps of the present invention. At step 100, a container in which a bulk material is stored is equipped with means for selectively shielding plural RFID tags on or associated with the container. At step 102, the container is also equipped with a shielding actuator that senses the amount of material contained in the container, relative to the capacity of the container, and actuates shielding based upon the sensed amount. The numerous methods of configuring an actuator for this purpose will be apparent to those of ordinary skill in the art, particularly in view of the described embodiments below.

At step 104, a correlation is made between the sensed amount of material in the container with the selective shielding of the plural RFID tags. For example, a processor can be configured to correlate the sensed condition of a half-full container (by weight, volume, mass, or any other method) with the shielding of a particular RFID tag or group of RFID tags, such that, for example, when all RFID tags are shielded except for a particular RFID tag, the sensing of signals from that RFID tag indicate the half-full condition.

At step 106, actual signals being emitted by unshielded RFID tags are sensed, and, based upon the sensed RFID tag or tags, the amount of material in a container is determined, and at step 108, a discernable indication of the determined amount, e.g., a display on a computer screen, a readout on a LED indicator, etc. is provided so that a user of the system can identify how much of the bulk material is contained within the container.

Using the method described above, it is possible to ascertain an approximation of how much bulk material is contained within a container, using the RFID tags associated therewith. This solves the problem described above, wherein all that is known is the existence or lack of existence of the container, based upon the sensing of the existence of an RFID tag.

The following description and figures describe alternative embodiments for enabling the above-described method. It is understood that the present claims are not limited to these embodiments, that is, they are provided for purpose of example and explanation only.

FIGS. 2A–2D illustrate a first embodiment of the present invention. In this embodiment, a container 200 containing a bulk material 202 is made of a material that will block the transmission from an RFID tag contained therein. As is well known, electrically-conductive materials will shield the radio-frequency signals emitted by the RFID tags, thereby preventing them from reaching the device reading the signals. Most metals will block the signals, as will some liquids and even plastics.

A slot 204 is formed within a wall of the container, e.g., the top 206 of the container, through which an indicator member, e.g., a plunger 208, is slidably inserted. Affixed along the length of the plunger 208 are a plurality of RFID tags 210, 212, 214, and 216. When more of the plunger 208 is outside the container, more RFID tags are exposed.

A bottom portion of the plunger 208 is preferably provided with a stop member 218 that prevents the plunger 208 from being easily pushed below a level of the bulk material 202 contained within the container. In other words, the stop member 218 is configured so that, under normal operation and use, it will simply "ride" on top of the bulk material 202. The stop member 218 can be the same shape as the container (square in this example) but it is not restricted to being the same shape. For example, a plate-shaped stop member (essentially disk-shaped) can also function to stop the plunger 208 from burying into the bulk material 202.

In use, a user will lift the top 206 off of the container 200 by grasping the plunger 208 and lifting upward. The user then removes whatever bulk material 202 they wish to use and replaces the top and plunger back onto the container 200. As the level of the bulk material 202 contained in the container decreases, the plunger 208 will move down into the container accordingly, thereby leaving a different and smaller number of the RFID tags outside of the container. By calibrating the system so that the number of exposed RFID tags corresponds to a proportion of the bulk material contained in the container, readings by the RFID reader from the RFID tags on the indicator member will provide an indication of approximately how full or how empty the container is.

An alternative embodiment is illustrated in FIGS. 3A–3F. In this embodiment, a stationary viewing window 341 in the side of container 300 functions in conjunction with a retractable guide assembly 340 to expose one or portions of two of the RFID tags among the plural tags 320, 322, 324, 326, 328, 330, and 332 contained thereon, and block transmissions from any RFID tags that are not within the stationary viewing window 341.

Figure 3A:
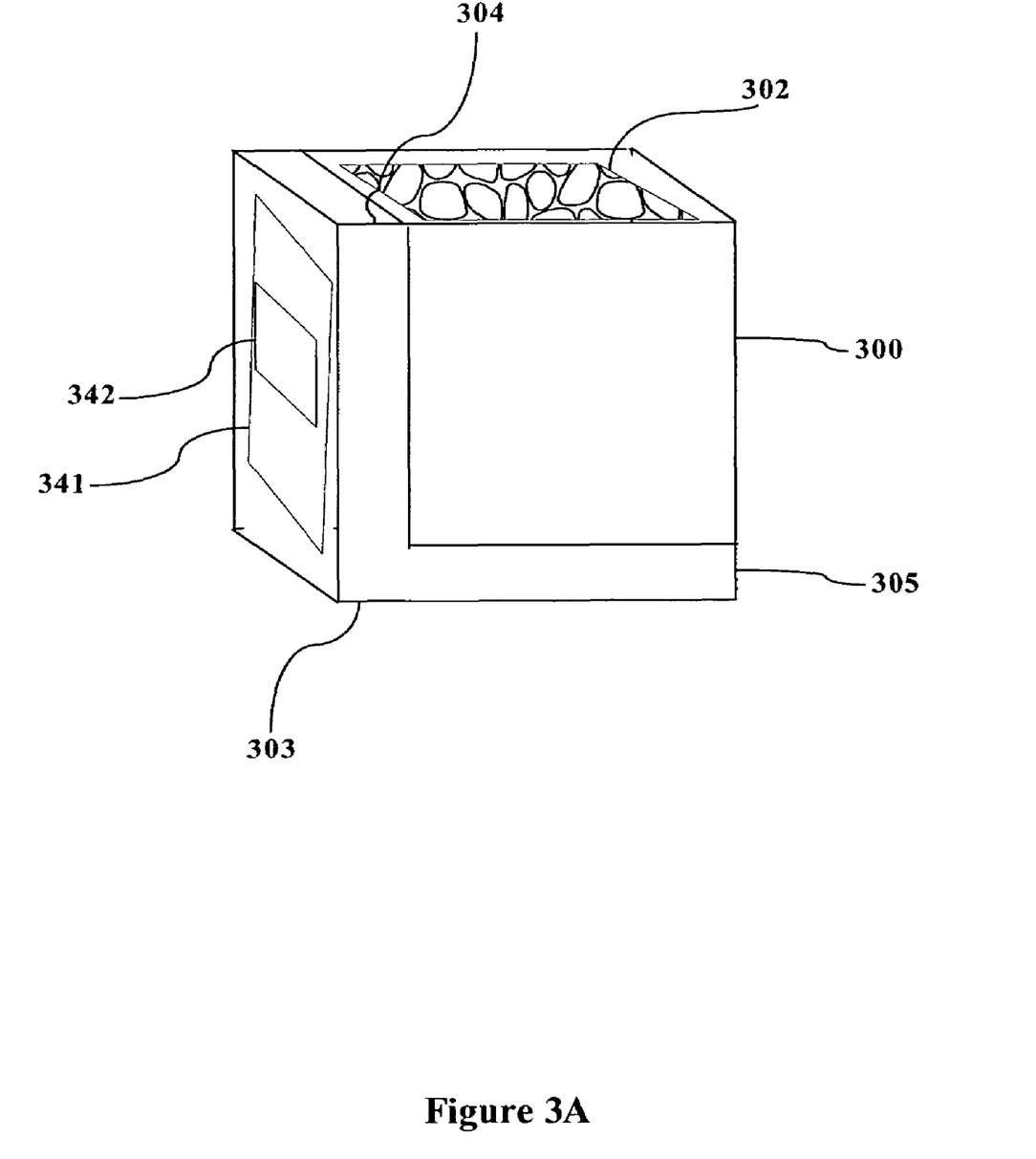
FIGS. 3A, 3B, and 3C show a perspective, cutaway side, and top view of a container.
Figure 3B:
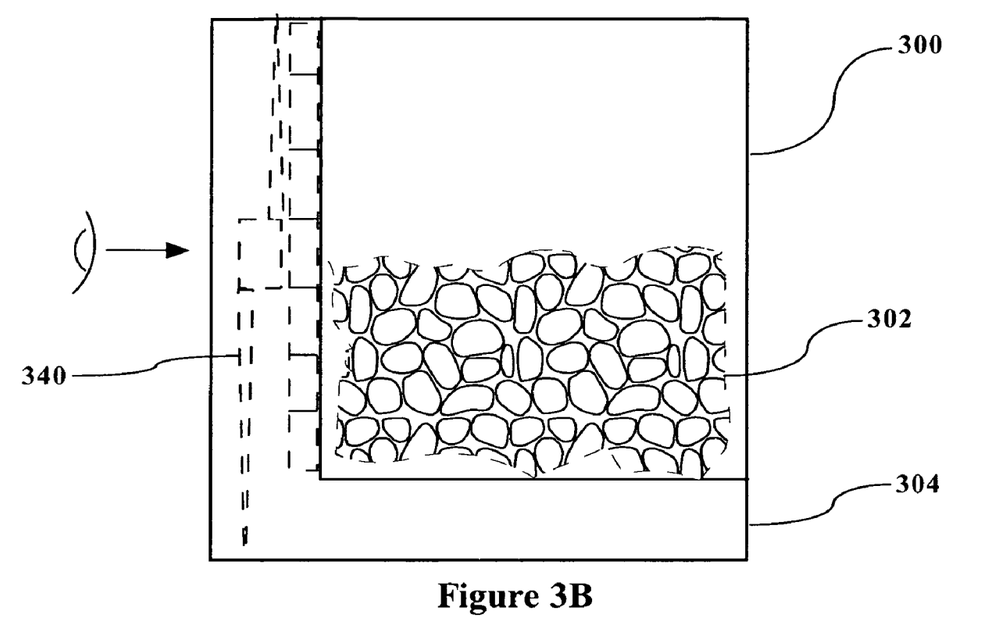
Figure 3C:
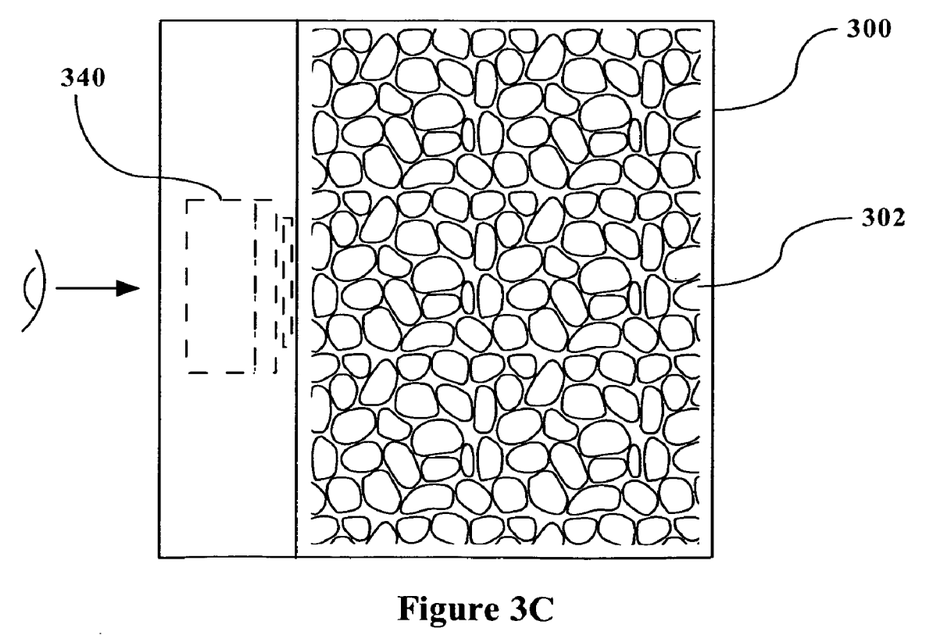

FIGS. 3A, 3B, and 3C show a perspective, cutaway side, and top view of container 300. A retractable guide assembly 340 is situated in the vertical member 304 of an L-shaped support structure 303. A horizontal member 305 of L-shaped support structure 303 provides a support surface for the bulk material 302 contained in the container 300. As described further below, the retractable guide assembly and horizontal member 305 function to enable the movement of the retractable guide assembly to selectively shield some of the RFID tags 320–332 while leaving one or portions of two of the RFID tags unshielded.

Figure 3D:
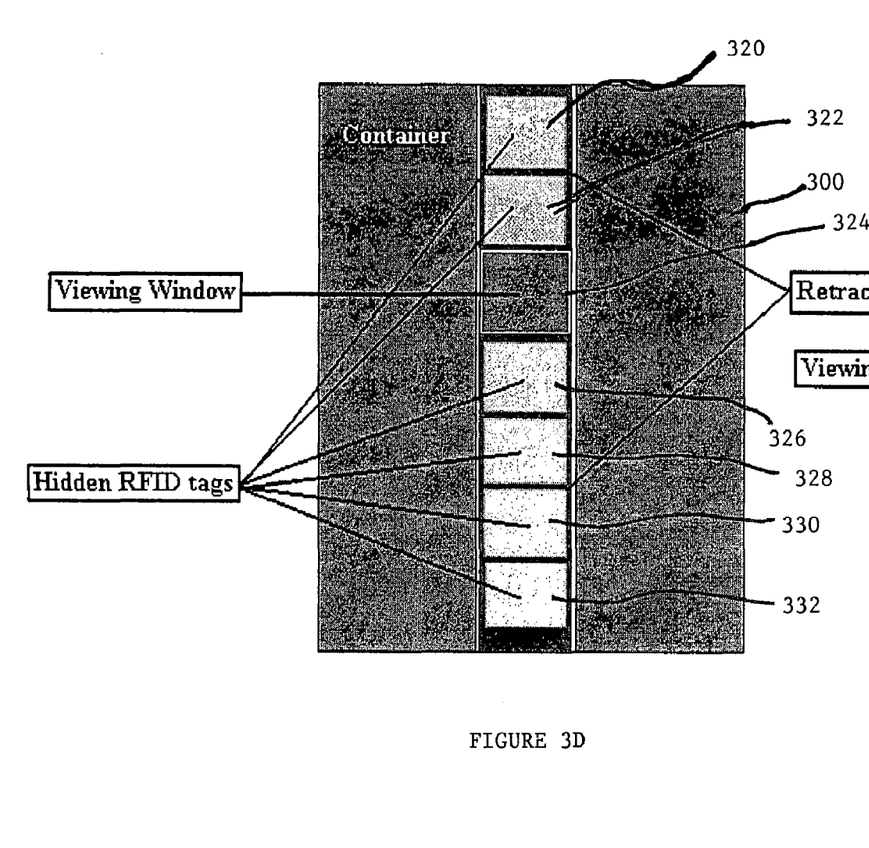
FIG. 3D is a front view of a container, looking in the direction of stationary viewing window.

FIG. 3D is a front view of container 300, looking in the direction of stationary viewing window 341. The view of FIG. 3D is a cutaway view so that the hidden RFID tags 320, 322, 326, 328, 330, and 332 can be seen in the drawing, although they are actually hidden from view. A moveable viewing window 342 allows RFID tag 324 in FIG. 3D to be exposed and thus unshielded.

The moveable viewing window 342 is moved up or down in front of the RFID tags 320–332 depending upon the amount of bulk material 302 contained in the container 300.

Figure 3E:
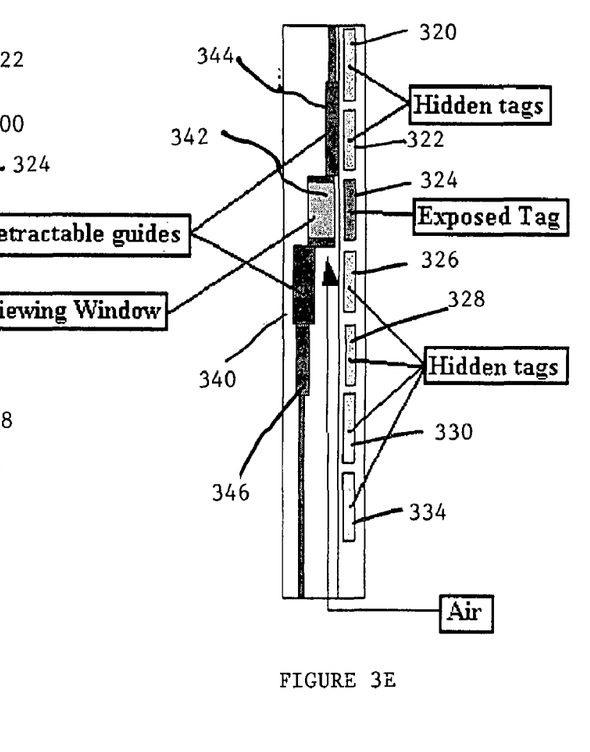
FIG. 3E is a cutaway side view of the retractable guide assembly.
Figure 3F:
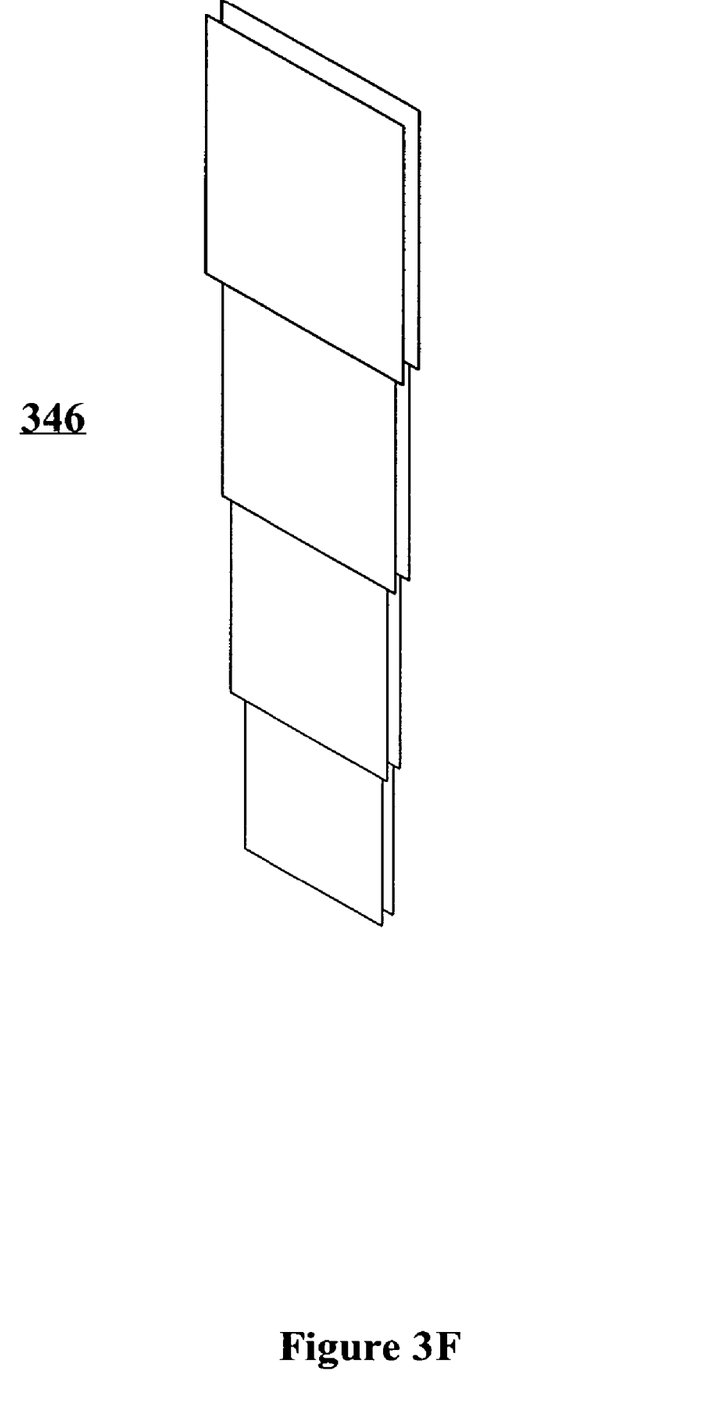
FIG. 3F illustrates in greater detail an embodiment of retractable guide.

FIG. 3E is a cutaway side view of the retractable guide assembly 340. Two retractable guides, 344 and 346 are connected at the top and bottom of moveable viewing window 342, respectively. The retractable guides 344 and 346 have telescoping capability, that is, they can increase or decrease in length in a manner similar to an automobile radio antenna. FIG. 3F illustrates in greater detail an embodiment of retractable guide 346; retractable guide 344 is essentially identical but is oriented in a reverse vertical position.

As can be seen from FIG. 3F, a series of progressively larger telescoping elements are provided, such that the smaller element can nest into the larger element adjacent thereto. In this manner, the retractable guides can expand or contract when urged in the appropriate direction. This enables the moveable guide window to be manipulated so that it is, at any given time, shielding all but one or two (portions of two) RFID tags.

To facilitate the movement of the moveable viewing window 342 in a manner that is correlated to the amount of bulk material 302 in the container 300, numerous methods can be employed. For example, a scale can be placed in the bottom of container 300 in, for example, the horizontal element 305 of L-shaped support structure 304 the scale can be an electronic scale that includes a processor programmed to trigger a mechanical movement to urge the moveable viewing window in an upward or downward direction based upon the type of material contained in the container and the overall weight of that material. The programming needed to perform this operation can be accomplished in a well know manner by a programmer of ordinary skill and details thereof are not discussed further herein.

The actual facilitation of movement of the retractable guides 344 and 346 can be coordinated with the output of the scale via a motor that is controlled by the processor.

An alternative embodiment for facilitating movement of the retractable guides 344 and 346 is to utilize a "closed system" whereby a fluid (air, a liquid, etc.) is placed in a fluid reservoir in such a manner that downward pressure on the base of container 300 forces the fluid to move in such a way that it causes and upward force against the movable viewing window 342. For example, a "bubble area" can be situated beneath the base, so that materials in the container push down on the bubble area. The bubble area can comprise a flexible material, e.g., soft plastic, that can contain the fluid but that offers flexibility when pressure is applied thereto. Thus, the more material that is placed atop the bubble area, the greater the downward pressure on the fluid contained therein, and thus the greater the upward pressure on the movable viewing window 342. The opposite is also true, i.e., when less material is placed atop the bubble area, the lesser the downward pressure is on the bubble area, and the lesser the upward pressure is on the movable viewing window 342. Using well-known calibration techniques, the system can be adjusted so that the RFID tags that are unshielded by virtue of their being situated in front of the moveable viewing window 342 can be associated with the various levels of material in the bin. The calibration process can take into consideration the different weights of different materials so that, for example, it may be set to be more sensitive to small pressure changes when a light cereal in in the container and be set to be less sensitive to small movements when a heavier material, such as sugar, is in the container.

Other ways to deal with the variations in the pressure exerted by various materials, and compensating for them, are also contemplated. For example, as noted above, a full bin of sugar will likely weigh considerably more (and thus exert considerably more pressure than) than a full bin of cereal. Different bases can be utilized with different weights of pressure being associated with different materials. Alternatively, settings can be implemented whereby a user can adjust the pressure exerted depending upon the type of material contained in the bin. Numerous other methods will be apparent to a designer of such a system.

The sensing of the RFID tags, and the determination as to the level of material within the bin based on the sensed RFID tags, can be accomplished using software means. For example, a processor can be configured to read certain RFID tags by their identification information, and, based upon sending the signals from a particular tag, display a value representing a particular quantity of material contained within the bin that is associated with that tag.

The above-described steps can be implemented using standard well-known programming techniques. The novelty of the above-described embodiment lies not in the specific programming techniques but in the use of the steps described to achieve the described results. Software programming code which embodies the present invention is typically stored in permanent storage of some type, such as permanent storage of a processor located within the container, or associated with the RFID reader device. In a client/server environment, such software programming code may be stored with storage associated with a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

It will be understood that each element of the illustrations, and combinations of elements in the illustrations, can be implemented by general and/or special purpose hardware-based systems that perform the specified functions or steps, or by combinations of general and/or special-purpose hardware and computer instructions.

These program instructions may be provided to a processor to produce a machine, such that the instructions that execute on the processor create means for implementing the functions specified in the illustrations. The computer program instructions may be executed by a processor to cause a series of operational steps to be performed by the processor to produce a computer-implemented process such that the instructions that execute on the processor provide steps for implementing the functions specified in the illustrations. Accordingly, the figures herein support combinations of means for performing the specified functions, combinations of steps for performing the specified functions, and program instruction means for performing the specified functions.

Although the present invention has been described with respect to a specific preferred embodiment thereof, various changes and modifications may be suggested to one skilled in the art and it is intended that the present invention encompass such changes and modifications as fall within the scope of the appended claims.

We claim:

1. A method of detecting an amount of material in a container, said container having one or more RFID tags attached thereto, comprising:
   providing automated shielding means for selectively shielding one or more of said one or more RFID tags; and
   associating one or more of said RFID tags with a predetermined amount of material stored in said container, wherein:
   said RFID tags are selectively shielded based on the amount of material in said container.

2. The method of claim 1, wherein said automated shielding means includes a shielding actuator that senses the amount of material in the container and actuates the selective shielding of one or more of said one or more RFID tags based on the sensed amount.

3. The method of claim 2, wherein said shielding actuator includes a scale for weighing the material contained in the container.

4. The method of claim 2, wherein said shielding actuator includes a pressure-sensitive actuator that actuates the shielding based upon the amount of pressure applied thereto.

5. The method of claim 1, further comprising:
   sensing signals being emitted by unshielded RFID tags;
   determining, based on the sensed signals, the amount of material in the container; and
   providing a discernible indication of the determined amount of material.

6. A system of detecting an amount of material in a container, said container having one or more RFID tags attached thereto, comprising:
   means for providing automated shielding means for selectively shielding one or more of said one or more RFID tags; and
   means for associating each of said RFID tags with a predetermined amount of material stored in said container, wherein:
   said RFID tags are selectively shielded based on the amount of material in said container.

7. The system of claim 6, wherein said automated shielding means includes a shielding actuator that senses the amount of material in the container and actuates the selective shielding of one or more of said one or more RFID tags based on the sensed amount.

8. The system of claim 7, wherein said shielding actuator includes a scale for weighing the material contained in the container.

9. The system of claim 7, wherein said shielding actuator includes a pressure-sensitive actuator that actuates the shielding based upon the amount of pressure applied thereto.

10. The system of claim 6, further comprising:
    means for sensing signals being emitted by unshielded RFID tags;
    means for determining, based on the sensed signals, the amount of material in the container; and
    means for providing a discernible indication of the determined amount of material.

* * * * *